United States Patent [19]
Lam

[11] Patent Number: 5,564,037
[45] Date of Patent: Oct. 8, 1996

[54] REAL TIME DATA MIGRATION SYSTEM AND METHOD EMPLOYING SPARSE FILES

[75] Inventor: Wai T. Lam, Westbury, N.Y.

[73] Assignee: Cheyenne Software International Sales Corp., Roslyn Heights, N.Y.

[21] Appl. No.: 413,056

[22] Filed: Mar. 29, 1995

[51] Int. Cl.⁶ .......................... G06F 12/02; G06F 17/30
[52] U.S. Cl. .......................... 395/488; 395/600
[58] Field of Search ........................ 395/488, 600

[56] References Cited

U.S. PATENT DOCUMENTS

| | | | |
|---|---|---|---|
| 5,276,867 | 1/1994 | Kenley et al. | 395/600 |
| 5,317,728 | 5/1994 | Tevis et al. | 395/600 |
| 5,333,315 | 7/1994 | Saether et al. | 395/600 |
| 5,367,698 | 11/1994 | Webber et al. | 395/800 |
| 5,479,656 | 12/1995 | Rawlings, III | 395/497.02 |
| 5,495,607 | 2/1996 | Pisello et al. | 395/600 |
| 5,506,986 | 4/1996 | Healy | 395/600 |

OTHER PUBLICATIONS

Novell® NetWare® 4.0 Architecture Revision 6.0, Software Developer's Kit, May 1993.

*Primary Examiner*—Paul V. Kulik
*Attorney, Agent, or Firm*—Kenyon & Kenyon

[57] ABSTRACT

A system and method for real time data migration in a networked computer system uses a known operating system feature, a sparse file, to represent a migrated file. The sparse file consumes a minimum amount of physical space on the file server but is defined as having the same size and attributes as the original final. When a user accesses a migrated file, the file appears to be resident on the file server and is automatically and transparently returned to the file server from an optimized storage location in a hierarchical storage management system.

13 Claims, 4 Drawing Sheets

REAL TIME DATA MIGRATION SYSTEM AND METHOD EMPLOYING SPARSE FILES

FIELD OF THE INVENTION

The present invention relates to a hierarchical storage management system and method in a networked computer system. More particularly, the present invention relates to a method for automatically and transparently migrating data from a file server to an auxiliary storage device.

BACKGROUND INFORMATION

Server-based data management systems have become standard office equipment and the need for data management is growing rapidly. Today, many employees in large corporations have a personal computer (PC) or a workstation that is connected to other computers via a Local Area Network (LAN).

A LAN generally includes a plurality of computer systems, such as computer workstations, that are connected together to share data and resources, such as a main memory and/or a printer. The LAN often includes file servers providing the network services. A file server is generally a node, e.g. a computer, on a computer network that provides service to the computer terminals on the network through managing a shared resource. For example, a file server can manage a set of storage disks and provide storage and archival services to computer terminals on the network that do not have their own disks, or that have data that needs to be stored externally.

Storage requirements of LANs are growing at a staggering rate. Many of today's servers handle gigabytes of data. In addition, the ability to store and protect data has become a critical issue for many network users. The most common way of protecting data is to keep it in more than one location. Server-based data management systems, such as the ARCserve® data management system, provide back-up and protection of data stored on a LAN file server and/or computer systems connected to the LAN.

Merely providing back-up and storage of data from a computer network, however, is not sufficient. In particular, the external storage of data needs to be automatic, optimal, and transparent to the network user. One technique for providing efficient external storage of data from a computer network is hierarchical storage management (HSM).

HSM includes storing computer network data external to the file server in a hierarchy of secondary, and possibly tertiary, storage devices. The external storage devices are generally high capacity storage devices such as Write Once Optical, Rewriteable Optical and Magnetic Tape. For instance, an optical storage device and a magnetic tape drive can be coupled to the file server as secondary and tertiary storage devices, respectively. Based on criteria established by the HSM application, data stored in the file server can be migrated to the optical storage device and, based on selectable criteria, further migrated to the tape drive.

For example, the frequency of use of the data can be used as a criterion for migrating the data from the file server to the secondary and tertiary storage devices. By migrating data which is infrequently used or accessed, space can be freed on the file server while users continue to scan files as if they still resided on the file server. Migration refers to the movement of data from a file server into a storage hierarchy (e.g. the external storage devices). Demigration refers to the retrieval of data from the storage hierarchy to the file server.

To obtain optimal benefit of a HSM application, the secondary and tertiary storage devices are arranged in a hierarchical arrangement for storing the data. Thus, a data file that has resided on the, network file server for a predetermined period of time can be migrated initially to an optical storage device, which provides for a relatively fast response time when the file is requested by the network file server. If the data file remains on the optical storage device for a predetermined period of time without being requested by the file server, then the data file can be further migrated, in accordance with a storage hierarchy, to a magnetic tape storage device, which has a relatively slow response time compared to the optical storage device. Thus, a hierarchical storage management system provides for a more efficient method of storing the data files of a networked computer system based on the cost, speed and capacity of the hierarchy of storage devices.

When a file is migrated from a file server, the original file is represented on the file server as a stub file, also referred to as a phantom file or a tombstone. The stub file represents the original file while using a minimal physical space allocation, thereby freeing as much space as possible on the file server. The stub file should also represent, however, the properties of the original file as closely as possible, e.g., the file size, the date created, the date last accessed or certain attributes, such as a read only file. Depending on the particular HSM implementation which performs the migration, however, the file size is not accurately represented. Rather, the stub file remaining at the file server has a size of 0, 422 or 1000 bytes, regardless of the actual size of the original file. For example, a 100 megabyte file can be migrated from the network file server to an external storage device and the stub file left on the file server generally will appear with a size of, 0, 422 or 1000 bytes.

Thus, known migration implementations may reduce the physical space allocation of the file server through the use of stub files to represent the migrated file, but the known migration methods do not accurately represent the actual properties of the original file. The accuracy of the representation, particularly the size of the original file, is important information for any software application where file size is utilized. For example, some LAN software applications attempt to provide statistical analysis of the amount of data owned by the file server, or perform some custom function based on particular file sizes reaching a predetermined value. If migrated files are not accurately represented, then the analysis or custom functions may not be properly performed. In addition, a DOS® operating system DIR command, for example, would provide the wrong file size to the user and lead to user confusion over the actual size of the file. Similarly, a DOS® operating system COPY command might show a 1000 byte size for a migrated file that is actually 2 megabytes, thus causing the user to attempt to copy the file onto a floppy disk that is too small.

A HSM implementation is generally tailored for particular LAN operating systems. For example, the NOVELL® NetWare® operating system is used in many LAN systems. Several versions of the NetWare® operating system exist, including versions 3.x and 4.x.

For example, in the NetWare® operating system versions 4.x, a Real Time Data Migrator (RTDM) feature is included. Using this feature, the contents of a file in a NetWare® file server (e.g. a file server running the NetWare® operating system) can be migrated to a secondary storage device with a file directory entry representing the migrated file being left in the file server. The file directory entry is empty and thus will not occupy physical space in the NetWare® file server.

In addition, the file directory entry will indicate the correct properties of the migrated file, including the actual size of the migrated file. When the migrated file is requested by the file server, the file will be automatically retrieved into the file server.

Thus, the NetWare® operating system version 4.x RTDM provides a tool for automatically and transparently migrating files from a NetWare® volume to secondary storage while keeping accurate directory entries in the original NetWare® volume for migrated files. On the other hand, the NetWare® operating system versions 3.x, for example, do not provide a migration functionality. Accordingly, software vendors must create a data migration function for NetWare® operating system version 3.x file servers. Known migration applications, however, do not provide a directory entry on the file server which is an accurate representation of the migrated file; depending on the application, the remaining directory entry will be a stub file having a size of 0, 422 or 1000 bytes rather than the actual size of the migrated file.

An object of the present invention is to provide for migration of data from, for example, a NetWare® version 3.x file server that eliminates the use of a stub file that does not accurately represent the size of the migrated file. Another object of the present invention is to provide file migration and demigration that is absolutely transparent to the user.

SUMMARY OF THE INVENTION

The system and method according to the present invention uses a known operating system feature, a sparse file, to represent a migrated file. A sparse file is a file which has a physical size (e.g. a physical allocation) that is less than its logical, or apparent, size. The sparse file thus minimizes the physical space occupied by a file while retaining the actual properties of the file, such as the size and the date created. A sparse file also can delete all data blocks of the original file and be defined as having a file size equal to the original file, thus accurately representing the original file while occupying essentially no physical space.

According to the system and method of the present invention, when a file is migrated from a file server to a storage medium, the file to be migrated is replaced in the file server with a sparse file defined as having the same logical size and attributes as the original file. The sparse file, however only consumes the minimum amount of space required to store a file, e.g. one data block. Migration key information is stored in the sparse file so that the file server can retrieve the migrated file when accessed by a user. When a user accesses a migrated file, the file appears to be resident on the file server with the actual properties of the file, and is automatically and transparently brought back to the file server from the secondary or tertiary storage medium. Thus, the hierarchical storage management method according to the present invention eliminates the use of a stub file having a predetermined and inaccurate size to represent a migrated file.

DETAILED DESCRIPTION OF THE INVENTION

Figure 1:
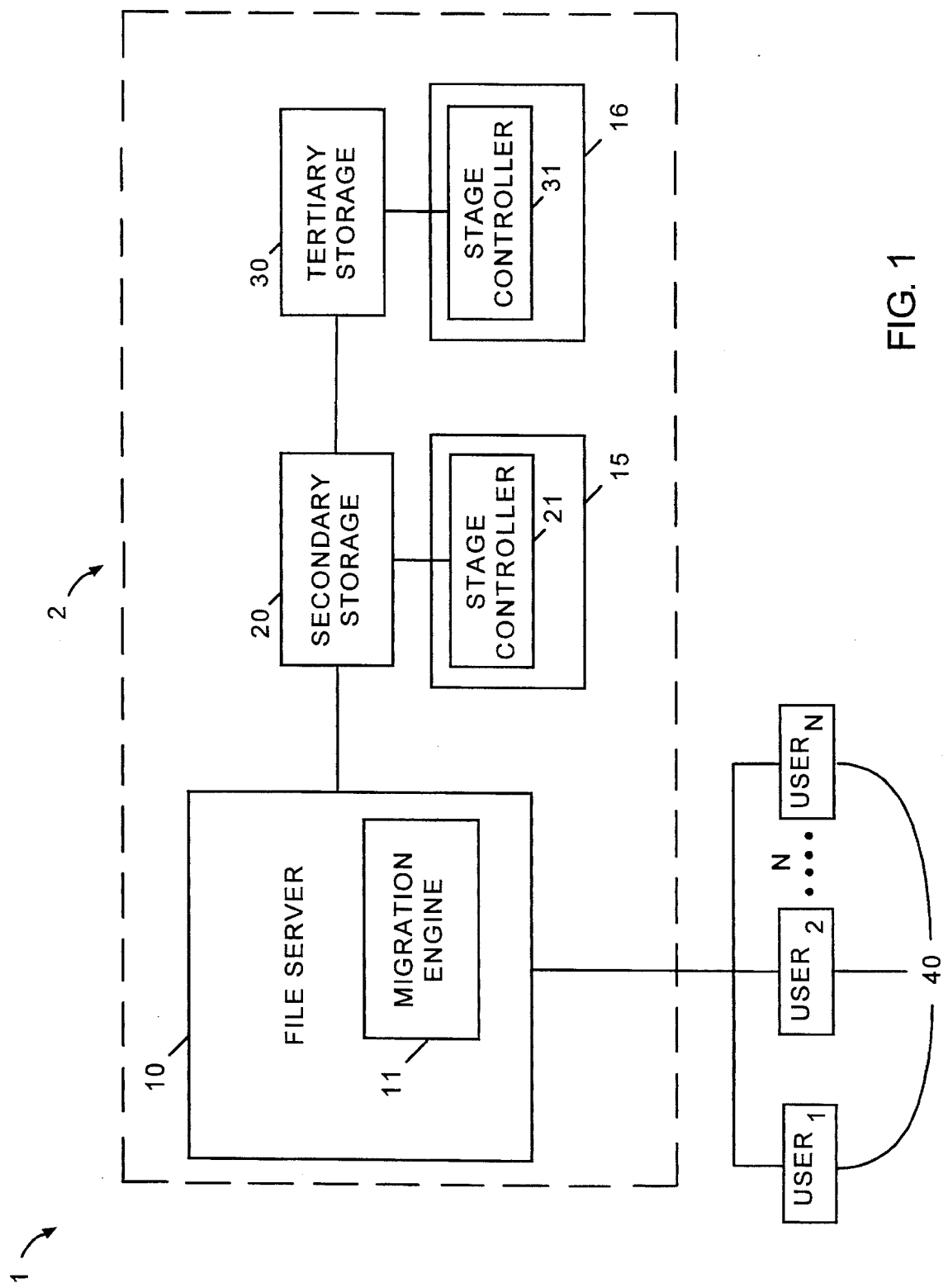
FIG. 1 shows a local area network system employing a hierarchical storage management system according to the present invention.

FIG. 1 illustrates a LAN system 1 including a HSM system 2 according to the present invention. The HSM system 2 provides HSM capabilities, for example, to the NetWare® operating system version 3.x environment and includes a file server 10, also referred to as a primary storage device, coupled to a secondary storage device 20. The secondary storage device 20 is further coupled to a tertiary storage device 30. By optimal use of the file server 10, secondary storage device 20 and tertiary storage device 30, the HSM system 2 can automatically and transparently hierarchically store, for example, gigabytes of data.

The LAN system 1 has, for example, a client-server architecture. The client is, for example, a plurality of workstations 40 coupled to the file server 10. A workstation 40 includes, for example, a microprocessor based computer system. At least one of the workstations 40 provides an interface for a user to establish migration criteria for data migration from the file server 10. The server side includes the file server 10 having a migration engine 11 that provides transparent data migration service from the file server 10 and demigration service to the file server 10.

The migration engine 11, for example, periodically runs and identifies inactive files according to predefined criteria. Once files are identified for migration, the files are migrated into a storage hierarchy of the HSM system 2, thereby resulting in additional storage space for active files on the file server 10. The HSM system 2 then manages the migrated files for migration within the storage hierarchy until the lowest level of the storage hierarchy is reached.

As shown in FIG. 1, the server side includes, for example, three distinct modules. The first module is the file server 10 from which it is desired to move preselected files, such as infrequently accessed files, to less expensive storage devices. The second module is the secondary storage device 20, such as an Optical Stage which supports an optical storage device. The Optical Stage can be on the same or a different NetWare® operating system server as the file server 10. The third module is the tertiary storage device 30, such as a Tape Stage which supports a tape changer. The Tape Stage can be on the same or a different NetWare® operating system server as the file server 10 or Optical Stage 20. The second and third modules together form the storage hierarchy. Generally, each stage in the storage hierarchy is a uniform collection of storage media, e.g. all media in the stage have the same physical property. Communication between the stages is done through a native NetWare® operating system communication protocol, such as IPX, SPX, TLI or TCP/IP. In addition to the secondary storage device 20 and tertiary storage 30 shown in FIG. 1, additional storage stages can be added to the HSM system as desired.

The optical storage device 20, such as a Rewriteable Optical device, generally has an access time in the 5–10 second range, as the storage media is removable and will usually need to be brought into the drive and spun up before it can be accessed. A jukebox device can be used for automatic operation of the optical storage; otherwise an operator would have to manually service media load requests. The tape storage device 30, such as a Hewlett-Packard 8 mm Tape Drive, can have an access time of several minutes, as the storage media is removable and will usually need to be brought into the drive before it can be accessed. An autochanger can be used for automatic operation of the tape storage; otherwise an operator would have to manually service media load requests.

Each stage in the exemplary storage hierarchy shown in FIG. 1 is controlled via a stage migrator 21, 31, respectively. The stage migrators 21, 31 include, for example, a software program resident on the file server 10 or on a separate file server. The stage migrators 21, 31, are located on the file server that is coupled to their respective secondary storage device 20 and tertiary storage device 30. As shown in FIG. 1, stage migrator 21 is located in file server 15 and stage migrator 31 is located in the server 16. Each stage migrator 21, 31, for example, manages migrated files, retrieves files upon request, and migrates files to the next stage in the storage hierarchy according to the rules of the storage hierarchy. Because each stage of the storage hierarchy has a stage migrator, the storage hierarchy can be distributed, thereby reducing the processing load on the file server 10 via, for example, file servers 15 and 16.

A user of the LAN system 1 can establish, for example, a system migration job for the entire file server 10 that will be run periodically to maintain the disk storage on the file server 10 within acceptable limits. The user also has the capability to do on-demand ad hoc migration or demigration jobs. All files from any file server 10, however, must migrate into the same storage hierarchy.

For a system migration job, that is, the migration of data from the file server 10, the user needs to indicate the files/directories that are candidates for migration. The selection process can be tailored by the user according to various criteria. For example, parameter variables for data migration can include a date variable, predetermined filters, or water marks which are based on the storage availability of a particular device.

The date parameter variable provides for the migration of files from the file server 10 based on, for example, the date the file was last accessed, the date the file was last updated or the creation date of the file. The predetermined filter parameter variable provides for the migration of files from the file server 10 based on, for example, a pattern match for a file name, an attribute of the file (e.g. system file, read only file) or a predetermined file size. The water marks parameter variable provides for the migration of files from the file server 10 based on the amount of storage space available at a particular storage device.

Using the water marks parameter, for example, the HSM system 2 could migrate files from the file server 10 to the secondary storage 20 when the storage space available at the file server 10 reached a critical water mark, at which point emergency migration would immediately occur in accordance with predetermined migration criteria to avoid a "volume full" situation. Files then would be migrated until the storage space available reached a high water mark (e.g., a safe level). The high water mark is defined, for example, as a percentage of the utilized space on the file server 10. When the utilized space is below the critical water mark and above the high water mark, files will be migrated at a predetermined time, for example, on a least recently accessed basis until a low water mark is reached. A low water mark is also defined, for example, as a percentage of the utilized space on the file server 10. When the utilized space is below the low water mark, no migration occurs from the file server 10.

The parameters for identifying files to be migrated from the file server 10 can be combined as desired by the user. When the user sets up a system migration job, the user also can specify whether further migration is to be performed, e.g., from the secondary storage device 20 to the tertiary storage device 30. In addition, the user can specify the period of time the migrated file must remain in a storage device before further migration is performed.

Figure 2:
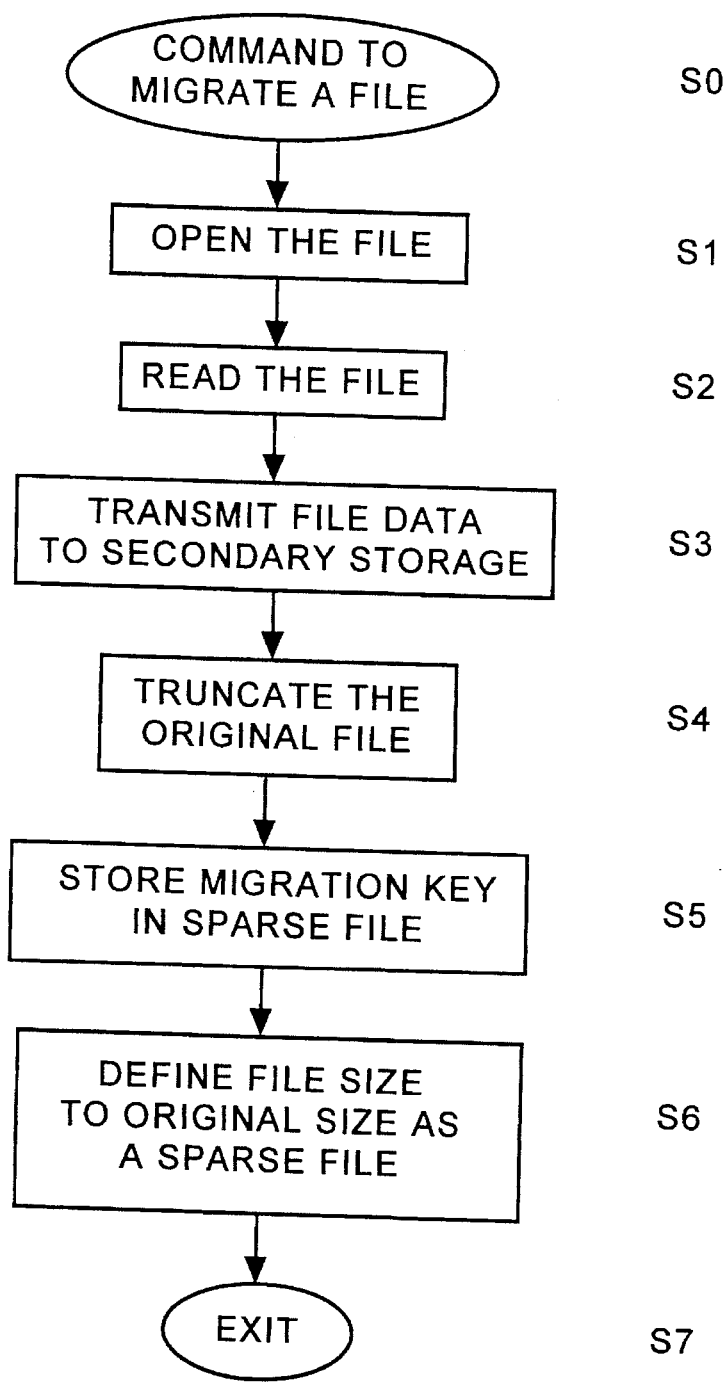
FIG. 2 is an illustrative flowchart of the method for real time data migration employing sparse files according to the present invention.

When a file residing in the file server 10 is identified for migration into the storage hierarchy of the HSM system 2, the method according to the present invention illustrated by the flowchart of FIG. 2 is implemented. As shown in FIG. 2, the process is initiated in step S0 when the migration engine 11 generates a command to migrate a file from the file server 10. In step S1, the file to be migrated is opened and the file is read in step S2. In step S3, a copy of the data blocks of the file to be migrated are transmitted to the secondary storage device 20. The stage migrator 21 returns a migration key to the migration engine 11 indicating the location of the migrated file.

Once the file has been transmitted to the secondary storage device 20, the original file, which is still residing in the file server 10, is truncated in step S4. The truncation of the original file in step 4 deallocates the data blocks of the original file so that the data blocks become available for reallocation by the file server 10. At this point, the original file has a physical allocation of, for example, zero data blocks due to the deallocation in step S4. In addition, the actual properties of the original file have been stored by the migration engine 11. In step S5, the migration key is written into the original file, which is now a sparse file having a physical size allocation of, for example, one data block containing the migration key. Thus, the sparse file physical allocation is smaller than the logical size of the original file. In step S6, the migration engine 11 defines the original file as having a logical size equal to the actual file size of the original file, thereby creating a sparse file having a physical size allocation of one block, but a logical size equal to the original file size. The migration process is completed in step S7 when the migration engine 11 exits the migration process.

Figure 4A:
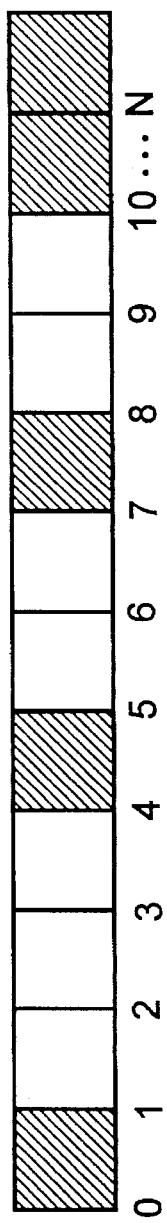
FIG. 4A shows a data file having a logical size.
Figure 4B:
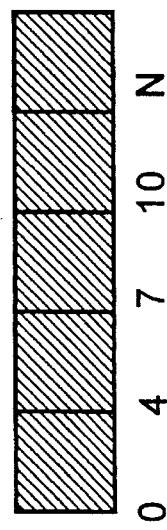
FIG. 4B shows a conventional sparse file representation of the file shown in FIG. 4A.

The conventional operation of sparse files is illustrated in FIGS. 4A and 4B. A file having a logical size of n data blocks (blocks 0–n), only some of which include data, is shown in FIG. 4A. For example, data blocks 0, 4, 7, 10 and n are shown in FIG. 4A as including data. The file shown in FIG. 4B is a sparse file that represents the file in FIG. 4A. The file in FIG. 4B has a physical size of, for example, five data blocks, representing only the occupied data blocks of FIG. 4A. Thus, the sparse file provides a method for creating a file having a physical size that is much less than its logical size, thereby preventing wasted storage space on the file server 10.

To create the sparse file shown in FIG. 4B, the computer programmer provides specific commands when creating the file which are recognized by the LAN system 1 operating system. For example, the Novell® Netware® operating system version 3.x interprets the SEEK command to not allocate the data blocks between SEEK addresses. In contrast, other operating systems treat the SEEK command as allocating the data blocks in between SEEK addresses. The steps shown below in Table I are exemplary of the steps that can be used to create the sparse file illustrated in FIG. 4B:

TABLE I a) Open File
b) Seek to data block 0
c) Write data of data block 0
d) Seek to data block 4
e) Write data of data block 4
f) Seek to data block 7
g) Write data of data block 7
h) Seek to data block 10
i) Write data of data block 10
j) Seek to data block n
k) Write data of data block n
l) Close file Accordingly, the steps shown in Table I are interpreted by the Novell® Netware® operating system version 3.x to only allocate the data blocks which are written to, thus creating a sparse file having only five data blocks, representing the occupied data blocks in 0, 4, 7, 10 and n. The sparse file indicates its actual size but when accessed by the user, the file is provided to the user in the form shown in FIG. 4A, that is, having a physical size allocation equal to its logical size.

Figure 4C:
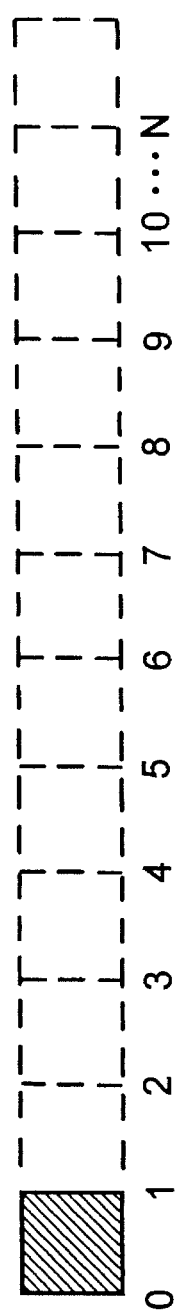
FIG. 4C shows a sparse file representation of the file shown in FIG. 4A according to the present invention.

In accordance with the present invention, the sparse file feature, for example, the Novell® Netware® operating system versions 3.x sparse file feature, is used represent a file that has been migrated from the file server 10 without including any of the occupied data blocks of the original file. Thus, as shown in FIG. 4C, a sparse file having only one data block but defined as having a logical size equal to the actual size of the file shown in FIG. 4A is generated by the method according to the present invention. The dotted lines shown in FIG. 4C indicate the logical size of the file but for which no data blocks have been allocated. Table II shows exemplary steps for the creation of the sparse file of FIG. 4C.

TABLE II a) Open file
b) Write migration key
c) Seek to actual original file size
d) Write "0"
e) Close file.

According to the present invention, the sparse file feature of the Novell® Netware® operating system is used minimize the physical allocation necessary to represent a migrated file on the file server 10 while retaining the actual properties of the original file. Accordingly, once the original file has been copied and sent to the secondary storage device 20 and then truncated, the remaining file in the file server can be operated on by the exemplary steps described in Table II. Step b, which performs a SEEK operation to the actual file size, defines the sparse file as having a logical size equal to the physical size of the original file. The deallocation of the original file, however, reduces the physical size occupied by the sparse file in the file server 10.

In addition to the steps shown in Table II, another set of exemplary steps for creating a sparse file according to the present invention is shown in Table III.

TABLE III a) Open file
b) Write migration key
c) Change Size to actual file size
d) Close file.

The CHANGE SIZE operation can be used to define the logical size of the sparse file because following the deallocation of the original file in the file server 10, there are no allocated data blocks which would be affected by the CHANGE SIZE operation. Therefore, the method according to the present invention uses a known operating system feature, a sparse file, to represent a migrated file in the file server 10, the sparse file having a minimal physical size while being defined as having the actual properties of the migrated file.

Figure 3:
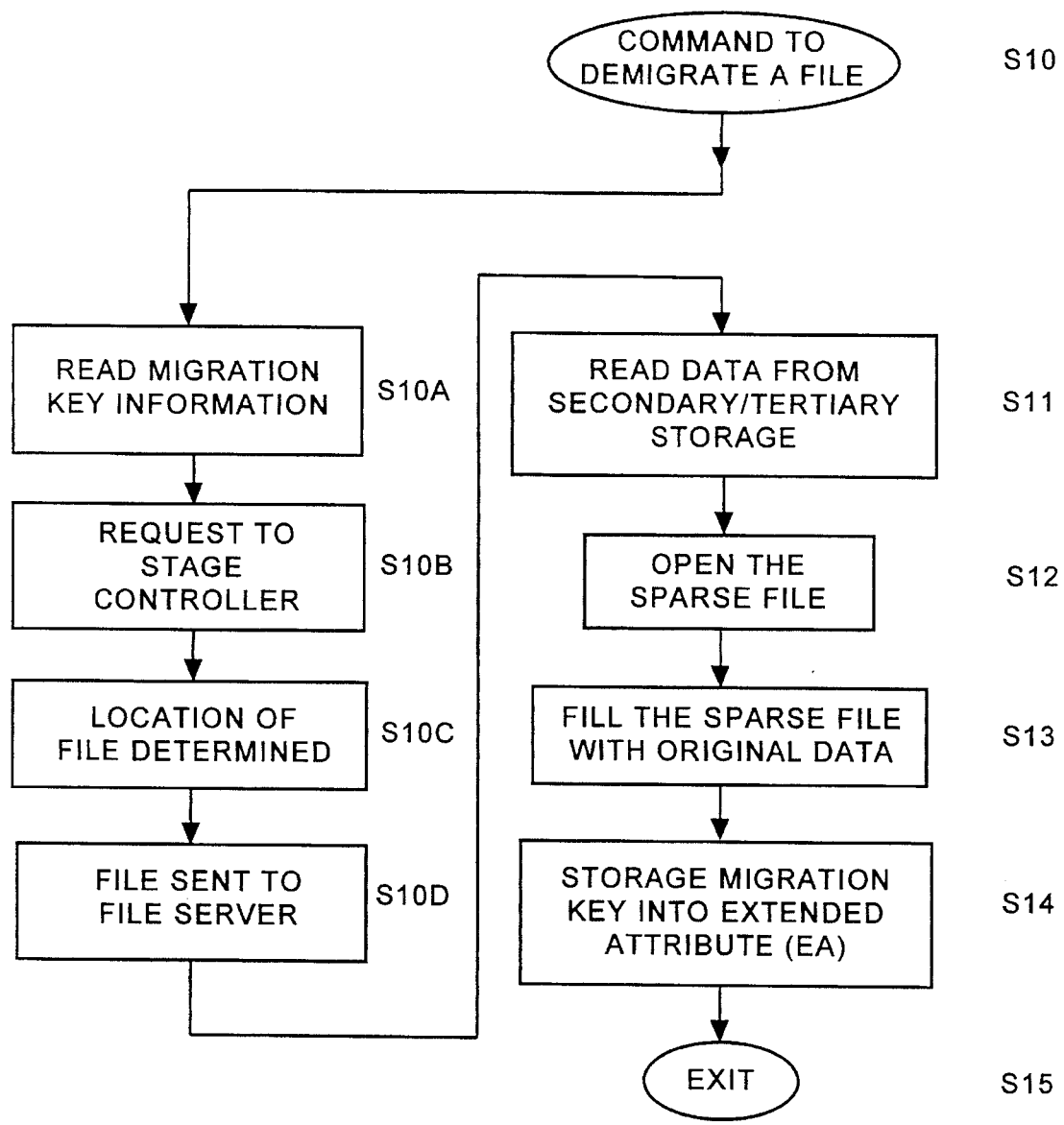
FIG. 3 is an illustrative flowchart of the method according to the present invention for real time data demigration employing sparse files according to the present invention.

Once a file has been migrated from the file server 10 into the HSM system 2, the file is retrieved via demigration to the file server 10. Demigration occurs, for example, when the user accesses a migrated file and the file server 10 requests the file via the migration engine 11. As shown in FIG. 3, the demigration process is initiated in step S10 when a migrated file is requested by the file server 10.

In step S10A, the migration engine 11 reads the migration key information stored in the sparse file to determine the location of the migrated file. In step S10B, the migration engine 11 sends the migration key to the stage migrator 21. The stage migrator 21 uses the migration key to determine, in step S10C, whether the requested file is located in the secondary storage device 20 or has been further migrated to the tertiary storage device 30. Once the file is located in step S10D, the file is sent to the file server 10 via the migration engine 11. In step S11, the migration engine 11 reads the data of the requested file.

After the data from the migrated file is read, the sparse file is opened in step S12 by the migration engine 11. In step S13, the contents of the original file retrieved from the HSM system 2 are loaded into the sparse file, converting the sparse file back to the original file having its original physical allocation. Thus, after step S13, the original file is again resident on the file server 10 in it original (e.g., pre-migration) form. In addition, the user was not aware that the directory entry on the file server 10 was actually a sparse file containing no actual data of the original file, but rather only limited descriptive information. Moreover, the demigration of the migrated file is automatic and transparent to the user.

In step S14, the migration key information formerly stored in the sparse file, which now no longer exists in the file server 10 but exists in the storage hierarchy because only a copy of the original file is retrieved from the storage hierarchy, is stored, for example, in the Novell® Netware® operating system Extended Attribute (EA). If the retrieved file is not modified and is later identified for migration, the former migration key will be utilized to prevent unnecessary data transfer into the storage hierarchy, since the file is already stored in an external storage device. In this case, only a sparse file will be created in the file server 10. In step S15, the migration engine 11 exits the demigration process.

What is claimed is:

1. A method for migrating a data file in a networked computer system from a primary storage device to a secondary storage device, the data file having a first actual size, comprising the steps of:

transmitting the contents of the data file to the secondary storage device;

truncating the data file; and generating a sparse file in the primary storage device having an apparent size equal to the first actual size and a second actual size less than the first actual size.

2. The method according to claim 1, further comprising the step of migrating the data from the secondary storage device to a tertiary storage device as a function of a predetermined storage hierarchy scheme.

3. The method according to claim 1, wherein the networked computer system includes a Novell® NetWare® version 3.x operating system.

4. The method according to claim 1, further comprising the step of:

storing a migration key in the sparse file.

5. The method according to claim 1, wherein the step of generating the sparse file further includes the steps of:

performing an open operation on the data file;

performing a first write operation on the data file;

performing a seek operation on the data file;

performing a second write operation on the data file; and performing a close operation on the data file.

6. The method according to claim 5, wherein the seek operation seeks to the first actual size.

7. The method according to claim 5, wherein the first write operation writes a migration key into the data file.

8. The method according to claim 1, wherein the step of generating the sparse file further includes the steps of:

performing an open operation on the data file;

performing a first write operation on the data file;

performing a change size operation on the data file; and performing a close operation on the data file.

9. The method according to claim 8, wherein the change size operation changes size to the first actual size.

10. A system for migrating a data file in a networked computer system from a primary storage device, the data file having a first actual size, comprising:

a migration engine coupled to the primary storage device; and a secondary storage device coupled to the migration engine;

wherein the migration engine reads the data file, transmits the contents of the data file to the secondary storage device, and generates a sparse file in the primary storage device having an apparent size equal to the first actual size and having a second actual size less than the first actual size.

11. The system according to claim 10, further comprising a tertiary storage device coupled to the secondary storage device for receiving a further migration of the data file as a function of a predetermined storage hierarchy scheme.

12. The system according to claim 10, wherein the migration engine stores a migration key in the sparse file.

13. The system according to claim 10, wherein the networked computer system includes a Novell® NetWare® version 3.x operating system.

* * * * *